United States Patent [19]

Pepmeier et al.

[11] 3,775,936

[45] Dec. 4, 1973

[54] APPARATUS FOR CENTERING CIRCULAR ARTICLES

[75] Inventors: Carl R. Pepmeier, Fredericksburg, Va.; Edward G. Lowe, Gloucester, N.J.

[73] Assignee: FMC Corporation, Philadelphia, Pa.

[22] Filed: June 14, 1972

[21] Appl. No.: 262,675

[52] U.S. Cl. ...................... 53/137, 53/373, 269/156

[51] Int. Cl. ............................................ B65b 67/10

[58] Field of Search ........................ 53/13, 137, 197, 53/204, 373; 269/104, 153, 156, 227, 296–300; 279/1 L, 1 M, 117; 29/271; 151/1.24; 82/45

[56] References Cited

UNITED STATES PATENTS

| | | | |
|---|---|---|---|
| 3,516,311 | 6/1970 | La Marca | 82/45 X |
| 3,178,192 | 4/1965 | Sampson | 82/45 X |
| 3,024,584 | 3/1962 | Wohlforth | 53/204 |
| 2,692,464 | 10/1954 | Thompson | 53/204 |

*Primary Examiner*—Travis S. McGehee
*Assistant Examiner*—John Sipos
*Attorney*—Thomas R. O'Malley et al.

[57] ABSTRACT

Apparatus for automatically centering circular articles which differ in diameter, as for example, a wrapping apparatus in which annular articles of varying circular dimensions are centered with respect to a sealing means. The invention described herein is applicable for use in a method of providing annular articles with a snug and substantially air-tight outer covering.

12 Claims, 9 Drawing Figures

APPARATUS FOR CENTERING CIRCULAR ARTICLES

The present invention is directed to an apparatus for automatically centering circular articles of different diameters.

The invention described herein is applicable for use in centering a variety of circular, discoidal, or annular articles which differ in diameter. For example, such article may be circular plates of varying diameters which are intended to undergo a like or similar operation, such as being perforated at the center thereof. A more specific application, which is hereafter described in detail, is in the wrapping of rolls of continuous sheet materials including tapes, ribbons, strapping, etc., desirably within snug, air-tight outer coverings. While the cores of these rolls are of like dimensions, the rolls themselves vary in diameter due to the different lengths of sheet material which are wound onto the roll cores or, when equal lengths are collected, to differences in thickness of such materials. Thus, providing such rolls with an air-tight outer covering can be achieved only by hand wrapping which is slow and tedious. Accordingly, a primary object is the provision of a generally new or improved apparatus for centering circular articles which differ in diameter.

Still another object is an improved apparatus for wrapping of annular articles which differ in outside diameter.

Still another object is the provision of an improved apparatus for providing rolls of sheet materials which vary in outside diameter with snug, generally air-tight outer coverings.

A further object is the provision of an apparatus in which annular rolls of continuous sheet materials which are wound on individual cores, are enveloped with wrapping materials which are secured in place with continuous and generally air-tight seals in the areas of the roll cores.

The above and other objects of the invention are achieved by an apparatus which includes an article supporting plate or table having three slots extending radially from a common point with the ends of all of such slots being spaced generally like distances from such common point and with the outermost of these slots each disposed in 45° spaced relationship with the remaining intermediate slot. Abutments project through and beyond the outermost of such slots, while a switch contact arm projects through and beyond the intermediate slot in such plate. These abutments and switch contact arm are connected for simultaneous movement in the same directions relative to the respective slots and means are provided for arresting such movement when the switch contact arm is engaged with the periphery of the particular circular article which is being centered.

More specifically, the abutments and switch contact arm are each connected along one side of the supporting plate to individual racks which mesh with a pinion gear for movement in the same directions relative to the respective slots. This pinion gear is fixed to a rotatable shaft which extends at substantially right angles to the supporting plates, with its longitudinal axis being aligned with the common point heretofore mentioned. Suitable guides support these racks for longitudinal movement and means are provided for returning the abutments and switch contact arm to like ends of the respective slots after each article centering operation has been completed.

The above described apparatus, as heretofore mentioned, is adapted for use in centering a wide variety of circular articles which differ in diameter. For use in wrapping rolls of continuous sheet materials, the above described apparatus is also provided with a reciprocable sealing member, and specifically an electrically heated shoe aligned with the common point or shaft axis, for fixing the outer covering in place.

In the wrapping of rolls of sheet materials with the above described apparatus, a wrapping material is enveloped along one end and sides of the individual rolls, and then across the opposite end thereof with the free ends of such wrapping material being draped into the roll core. With one embodiment of the present invention, the peripheral portion of such partially wrapped roll is merely urged against the abutments which, together with the switch contact arm, are located at the innermost ends of their respective slots. The innermost ends of such slots are spaced from the axis of the rotatable shaft a distance less than the radii of the annular rolls which are to be wrapped and thus, at this initial stage, the periphery of this partially wrapped roll engages only with the two abutments.

With continued movement of such roll against the abutments, the abutments are moved radially outward along their respective slots. By means of the racks to which the abutments are attached, movement is imparted to the rotatable shaft which, in turn, transmits motion to the remaining rack so as to cause the switch contact arm to also move radially along the intermediate plate slot to the same degree as the abutments.

Obviously, the further the abutments are moved away from the axis of the rotatable shaft, the greater becomes the spacing between these abutments along the periphery of the annular roll and the more closely does such roll periphery approach the switch contact arm. Thus, when the abutments are urged into positions which are spaced from the axis of the rotatable shaft a distance equal to the radius of the partially wrapped article, the switch contact arm also comes into contact with the roll periphery and the annular roll is centered with respect to the axis of the rotatable shaft. At the instant the switch is actuated through its contact arm, it electrically energizes a brake so as to prevent any further movement of the rotatable shaft.

A separate sheet of heat-sealable wrapping material, preferably having dimensions only slightly larger than the diameter of the roll core, is placed over the open end of the roll core after which the heated shoe is depressed and urged against such sheet to seal the same to the first applied wrapping material. Since all roll cores are of substantially the same diameter the heated shoe is desirably of a diameter generally equal to the outside diameter of the roll core so as to effect sealing of the wrapping materials continuously along the end of such core. Upon removal of the now completely wrapped annular roll away from the switch contact arm, the electrical circuit to the brake is interrupted so that the abutments and switch contact arm return to the innermost ends of their respective slots.

The partial wrapping of the annular roll as described above may be achieved by hand or by some apparatus suitable for this purpose and does not constitute a part of the present invention. Any heat-sealable wrapping material having the necessary protective properties, such as moisture and/or gas proof characteristics, may be employed in the above described method. Cellophane having a heat-sealable coating on one side thereof has been satisfactorily employed as an overwrap for annular rolls of cellophane.

In a second embodiment of the invention, an additional pair of slots are provided in the article supporting plate or table, with such slots extending radially from the axis of the rotatable shaft and being disposed in 90° spaced relationship with the outermost slots heretofore described. Abutments project through and beyond these additional slots and are also carried by reciprocable racks which mesh with the pinion gear fixed to the rotatable shaft.

With this modified apparatus, the abutments and switch contact arm are initially located at the outermost ends of their respective slots and, during the centering operation, move radially toward the axes of the rotatable shaft until the abutments and switch contact arm engage with the periphery of the partially wrapped article. Aside from this distinction, wrapping of annular rolls is effected in generally the same manner as described above.

In the drawing, FIG. 1 is a plan view of a portion of one embodiment of the apparatus of the present invention;

Figure 1:
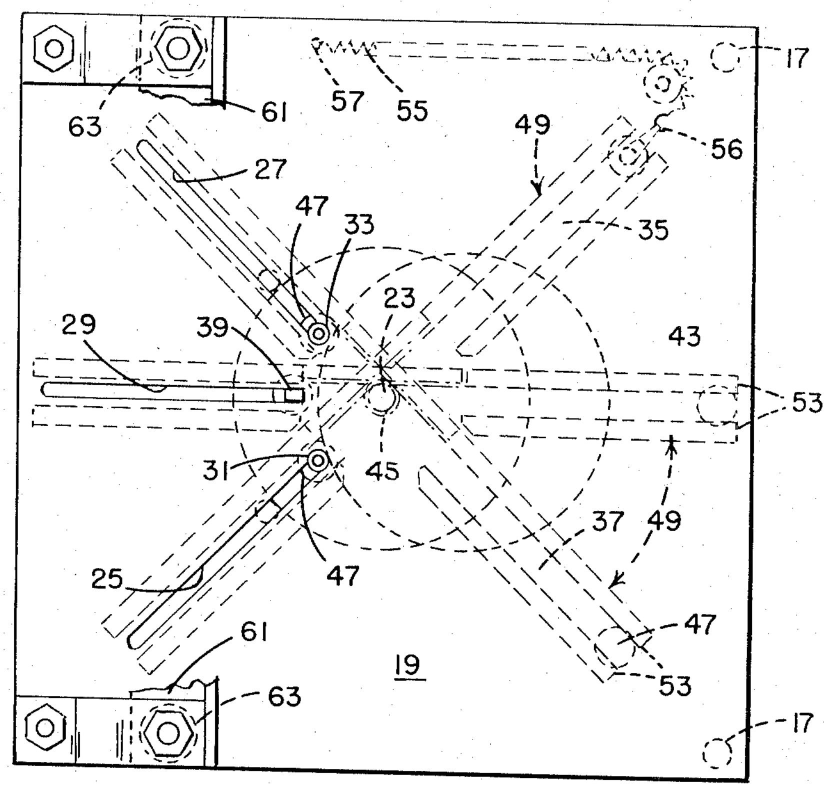
Figure 2:
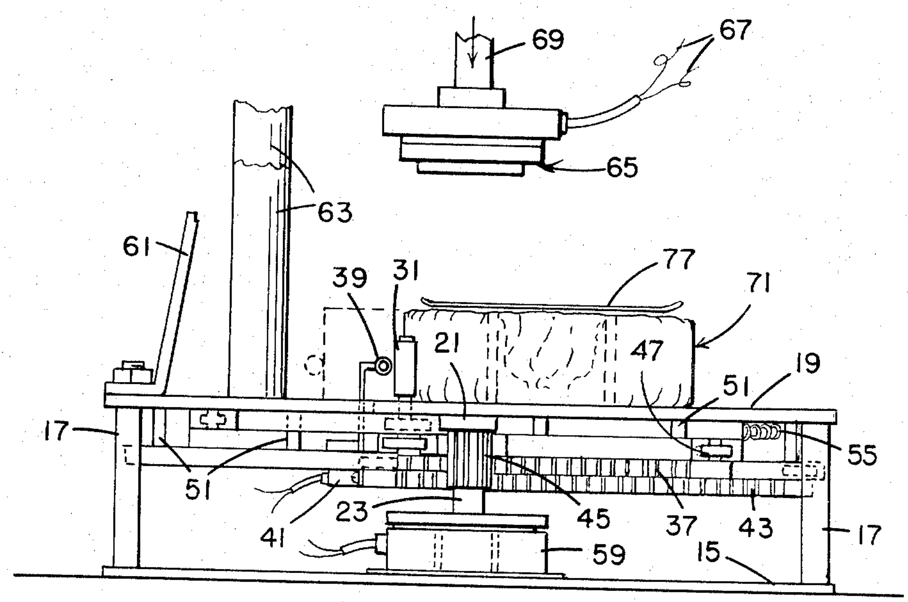
FIG. 2 is a side view of the apparatus shown in FIG. 1.

With reference to FIGS. 1–4 of the drawing, the embodiment of the apparatus there illustrated includes a base member 15 having spacers 17 fixed to the corners thereof which, in turn, carry an article support plate or table 19. A bearing 21, secured to the underside of the plate 19, and a similar bearing, not shown, attached to the top side of the base member 15, together rotatably support a shaft 23.

The plate 19 is provided with slots 25, 27 and 29 which extend radially from the longitudinal axis of the shaft 23, with the slots 25 and 27 each being disposed at 45° angles relative to the slot 29. All of the slots 25, 27 and 29 are of like dimensions and, at their innermost ends, are spaced like distances from the axis of the shaft 23.

Projecting through and beyond the slots 25 and 27 are abutments 31 and 33 which, at their lower most ends are fixed to racks 35 and 37, respectively. As illustrated, and for reasons as will be more apparent hereafter, the abutments are preferably rollers. Projecting through the slot 29 is a contact arm 39 which is pivoted to and constitute a part of a switch 41 carried by a rack 43.

Figure 3:
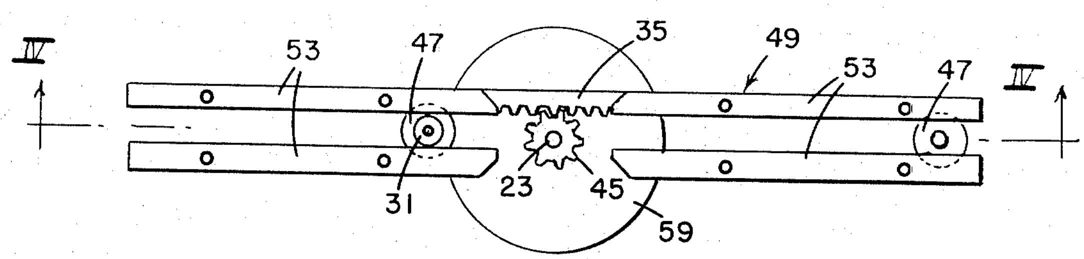
FIG. 3 is a fragmentary view of a portion of the apparatus shown in FIGS. 1 and 2.
Figure 4:
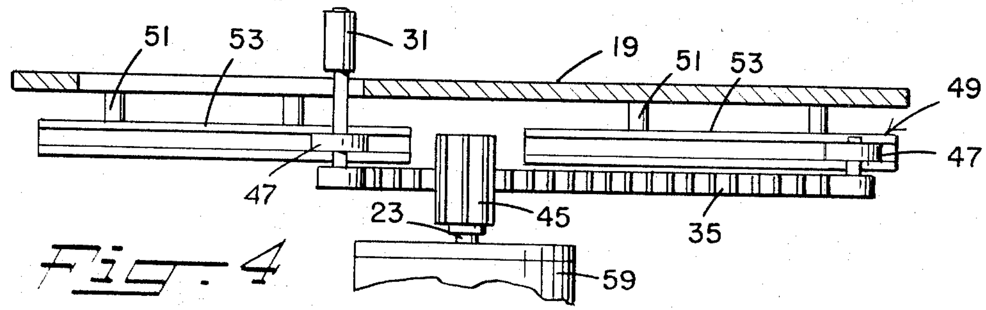
FIG. 4 is a section taken along the line IV—IV of FIG. 3.

In a manner as shown in FIG. 1 the racks 35, 37 and 43 mesh with a pinion gear 45, which is fixed to the shaft 23, for simultaneous movement in the same direction relative to the respective slots 25, 27 and 29. The racks 35, 37 and 43 are each provided with rollers 47 at the opposite ends thereof which are adapted to ride along individual guides 49 which are suspended at different elevations below the plate 19 by spacers 51. As shown in FIGS. 1, 3 and 4, the guides 49 each consist of aligned, spaced pairs of tracks 53 which provide continuous rack support yet facilitate engagement of the respective racks with the gear 45.

The abutments 31 and 33 and the switch contact arm 39 are urged toward the innermost ends of the respective slots 25. 27 and 29, as shown in FIG. 1, by a tension spring 55 which is connected at one end 56 to the rack 35 and at its opposite end 57 to the plate 19. The switch 41 is connected to an electric source and to an electric brake 59 which surrounds shaft 23. In the position of the switch contact arm 39 shown in FIG. 1, an open circuit exists between the switch 41 and brake 59 and under these conditions the shaft 23 is free to rotate when urged by the racks.

Extending upwardly from the plate 19 and braced by suitable tension members 61 are posts 63 which support a reciprocable heated shoe 65 in alignment with the axis of the shaft 23. The shoe 65 is electrically heated through wires 67 and is reciprocable toward and away from the plate 19 by any suitable means. For example, the shoe 65 may be fixed to one end of a rod 69 which has at its opposite end a piston, not shown, which is hydraulically reciprocated relative to the plate 19.

Figure 5:
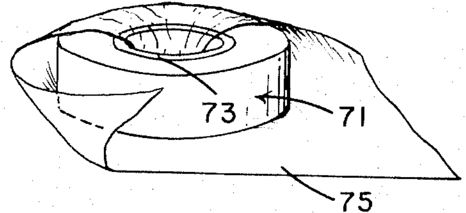
FIG. 5 and 6 illustrate the partial wrapping of an annular roll of continuous sheet material preparatory for use in the apparatus of the present invention.
Figure 6:
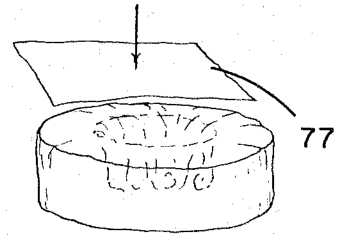

In employing the above described apparatus in wrapping a roll 71 of continuous sheet material which is wound on a core 73, the roll is first partially wrapped as shown in FIGS. 5 and 6. This partial wrapping may be achieved by hand by simply placing the roll 71 on a sheet of wrapping material 75 and tucking or draping the corners of such sheet material into the open end of the roll core 73. A separate sheet 77 of wrapping material may be then laid upon the partially wrapped roll 71 as shown in FIG. 6.

This partially wrapped roll 71 is then slid along the surface of the plate 19 against the abutments 31and 33 so as to urge the same along their respective slots 25 and 27. This movement of the abutments 31 and 33 is transmitted by their racks 35 and 37 to the shaft 23 which is rotated and causes the pinion gear 45 to drive the rack 43 and impart movement of the contact arm 39 along the plate slot 29. The abutments 31 and 33 are urged away from each other during their movement along the slots 25 and 27 and, being in the form of roller, effect this separation without disturbing the wrapping material 75 which has been applied to the roll 71.

Figure 7:
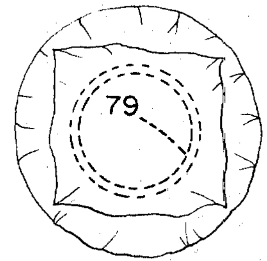
FIG. 7 is a plan view of the annular roll shown in FIGS. 2, 5 and 6, after the complete wrapping thereof.

The above described movement of the partially wrapped roll 71 is continued until the abutments 31 and 33 are separated to such degree as to permit the periphery of the roll to engage with the switch contact arm 39. At this instant the electrical circuit between the switch 41 and brake 59 is completed whereby the shaft 23 is locked against further rotation. The roll 71 is now centered with the shaft 23 and the heated shoe 65, the latter of which is then lowered into engagement with the sheet 77 to effect the sealing thereof to the wrapping material 75 in the area of the roll core 73, as shown at 79 in FIG. 7. Upon removal of the now completely wrapped roll away from the switch contact arm 39, the electrical circuit to the brake 59 is opened. The racks 35, 37, and 43 are then retracted by the spring 55, thereby returning the abutments 31 and 33 and the contact arm 39 to their original positions.

Figure 8:
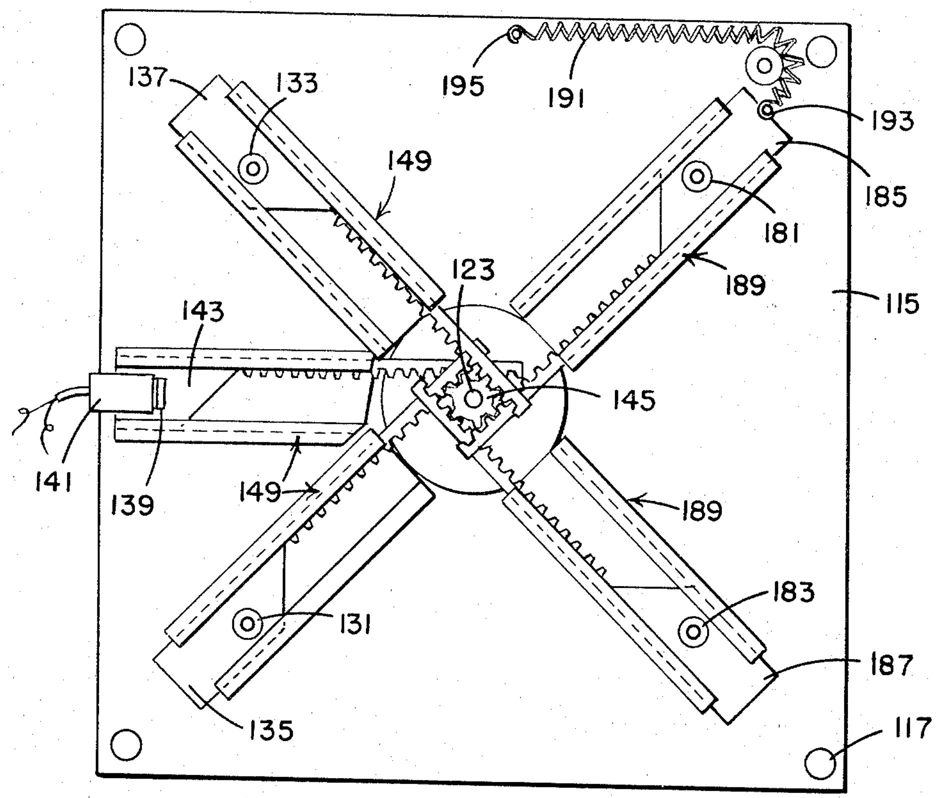
FIG. 8 is a plan view of a portion of a second embodiment of the apparatus of the present invention with portions thereof being removed.
Figure 9:
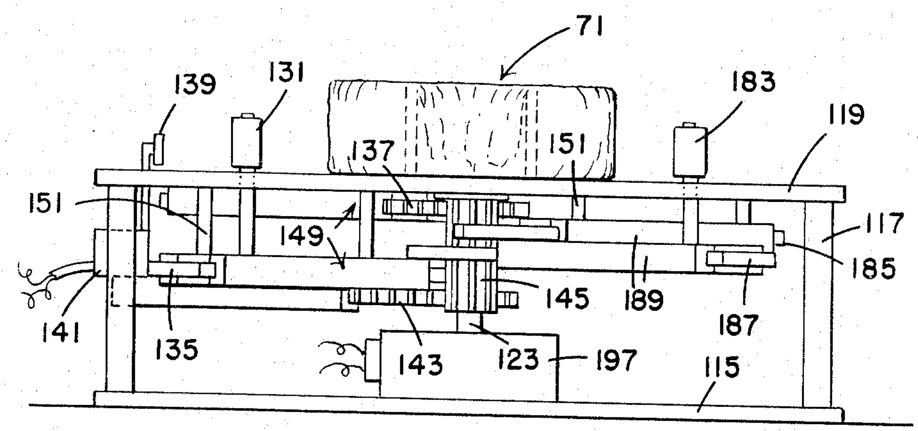
FIG. 9 is a side view of the apparatus shown in FIG. 8.

The second embodiment of the apparatus of the present invention shown in FIGS. 8 and 9 includes the elements of the apparatus heretofore described, with such of the previously described elements as are illustrated being designated by reference characters to which 100 has been added. Thus, this second embodiment includes a base member 115, spacers 117, and an article support plate or table 119 having slots, not shown, corresponding to the slots 25, 27 and 29 heretofore described. A shaft 123 extends at right angles to the support plate 119 and is positively driven as hereafter described.

Abutments 131 and 133 extend through slots in the plate 119, which correspond to the slots 25, 27, and are carried by racks 135 and 137, respectively. Similarly, a contact arm 139 of a switch 141 projects through a slot in the plate 119, which corresponds to the slot 29, and is carried by a rack 143. The racks 135, 137 and 143 mesh with a pinion gear 145, which is fixed to the shaft 123, and are supported by individual guides 149 suspended from the plate 119 by spacers 151.

Incorporated into the apparatus shown in FIGS. 8 and 9 is an additional pair of abutments 181 and 183 fixed to racks 185 and 187 which also ride along individual suspended guides 189. The abutments 181 and 183 project through slots, not shown, in the plate 119, which slots are similar to and are disposed in 180° relationship with the slots which accommodate the abutments 131 and 133.

The racks 135, 137, 143, 185 and 187 are urged into positions as shown in FIG. 8 by a tension spring 191 which is fixed at 193 to the rack 185 and at 195 to the support plate 119. A motor 197, electrically connected to the switch 141, serves to drive the shaft 123 when actuated by the operator through suitable means, not shown.

During centering of an annular article, the article 71 is partially wrapped with a sheet material 75 as heretofore described and is then positioned between the abutments 131, 133, 181 and 183. In this embodiment the switch 141 is normally closed and thus, upon setting the motor 197 in operation, the abutments 131, 133, 181 and 183 and the switch contact arm 139 together move radially inward, against the action of the spring 191, toward the partially wrapped article until the contact arm engages with the article periphery. At this instant, the switch 141 is actuated, opening the electrical circuit to the motor 197 and thus stopping the same. With the partially wrapped article 71 now centered, a sheet 77 is placed over the open end of its core 73, as shown in FIG. 6, and is sealed in place using a heated shoe, such as the shoe 65, as heretofore described.

It is to be understood that changes and variations may be made without departing from the spirit and scope of the invention as defined in the appended claims.

We claim:

1. Apparatus for use in centering circular articles of different diameters including a plate having three slots extending radially from a common point with the ends of all of said slots being spaced like distances from such common point, the outermost of said slots each being disposed in 45° spaced relationship with the remaining intermediate slot, abutments projecting through and beyond said outermost slots, a switch contact arm projecting through and beyond said intermediate slot, means connecting one end of each of said abutments and switch contact arm for simultaneous movement in the same directions relative to the respective slots, and means actuated by said switch contact arm for arresting movement of said abutments and switch contact arm when said switch contact arm is engaged with the periphery of a circular article being centered.

2. Apparatus as defined in claim 1 wherein said movement arresting means is a brake electrically connected with said switch contact arm.

3. Apparatus as defined in claim 1 wherein said means connecting said abutments and switch contact arm for simultaneous movement includes a rotatable shaft extending at substantially right angles to said plate with the longitudinal axis of said shaft aligned with said common point, a pinion gear fixed to said shaft, an individual rack supporting each of said abutments and switch contact arm and engaging with said pinion gear, and guides supporting the respective racks for longitudinal movement relative thereto.

4. Apparatus as defined in claim 3 wherein said movement arresting means is a brake electrically connected with said switch contact arm.

5. Apparatus as defined in claim 4 wherein said abutments are movable away from said common point along their respective slots by urging the article which is to be centered against the same, and further including means for returning said abutments and switch contact arm to the innermost ends of the respective slots after the article is removed away from said abutments.

6. Apparatus as defined in claim 5 wherein said brake is operative on said shaft.

7. Apparatus as defined in claim 3 further including additional slots in said plate extending radially from said common point with each of said additional slots being disposed in 90° spaced relationship with adjacent of said outermost slots, additional abutments projecting through and beyond said additional slots, racks engaged with said pinion gear and supporting said additional abutments, means for moving all of said abutments and switch contact arm from the outermost ends of the respective slots toward said common point and into engagement with an article which is to be centered, and means for returning all of said abutments and switch contact arm to the outermost ends of the respective slots after the centering of an article.

8. Apparatus for wrapping annular articles of different diameters in which a wrapping material is enveloped along one end, side and across the opposite end thereof with the free ends of the wrapping material being tucked into the article opening, said apparatus including an article supporting plate on which the one end of the partially wrapped article is adapted to be disposed, three slots in said plate extending radially from a common point with the ends of all of said slots being spaced like distances from such common point, the outermost of said slots each being disposed in 45° spaced relationship with the remaining intermediate slot, abutments projecting through and beyond said outermost slots, a switch contact arm projecting through and beyond said intermediate slot means connecting said abutments and switch contact arm for simultaneous movement in the same directions relative to the respective slots, means actuated by said switch contact arm for arresting movement of said abutments and switch contact arm when said switch contact arm is engaged with the periphery of the partially wrapped article whereby the article is centered with the common point, and means positioned above and movable toward and away from said common point for securing the free ends of the wrapping material in place.

9. Apparatus as defined in claim 8 wherein said wrapping material securing means includes a circular heated shoe for adhering a separate sheet of wrapping material to the wrapping material enveloped about the annular article.

10. Apparatus as defined in claim 9 wherein said means connecting said abutments and switch contact arm for simultaneous movement includes a rotatable shaft extending at substantially right angles to said plate with the longitudinal axis of said shaft aligned with said common point, a pinion gear fixed to said shaft, an individual rack supporting each of said abutments and switch contact arm and engaging with said pinion gear, and guides supporting the respective racks for longitudinal movement relative thereto.

11. Apparatus as defined in claim 10 wherein said abutments are movable away from said common point along their respective slots by urging the article which is to be centered against the same, and further including means for returning said abutments and switch contact arm to the innermost ends of the respective slots after the article is removed away from said abutments.

12. Apparatus as defined in claim 10 further including additional slots in said plates extending radially from said common point with each of said additional slots being disposed in 90° spaced relationship with adjacent of said outermost slots, additional abutments projecting through and beyond said additional slots, racks engaged with said pinion gear and supporting said additional abutments, means for moving all of said abutments and switch contact arm from the outermost ends of the respective slots toward said common point and into engagement with an article which is to be centered, and means for returning all of said abutments and switch contact arm to the outermost ends of the respective slots after the centering of an article.

* * * * *